UNITED STATES PATENT OFFICE.

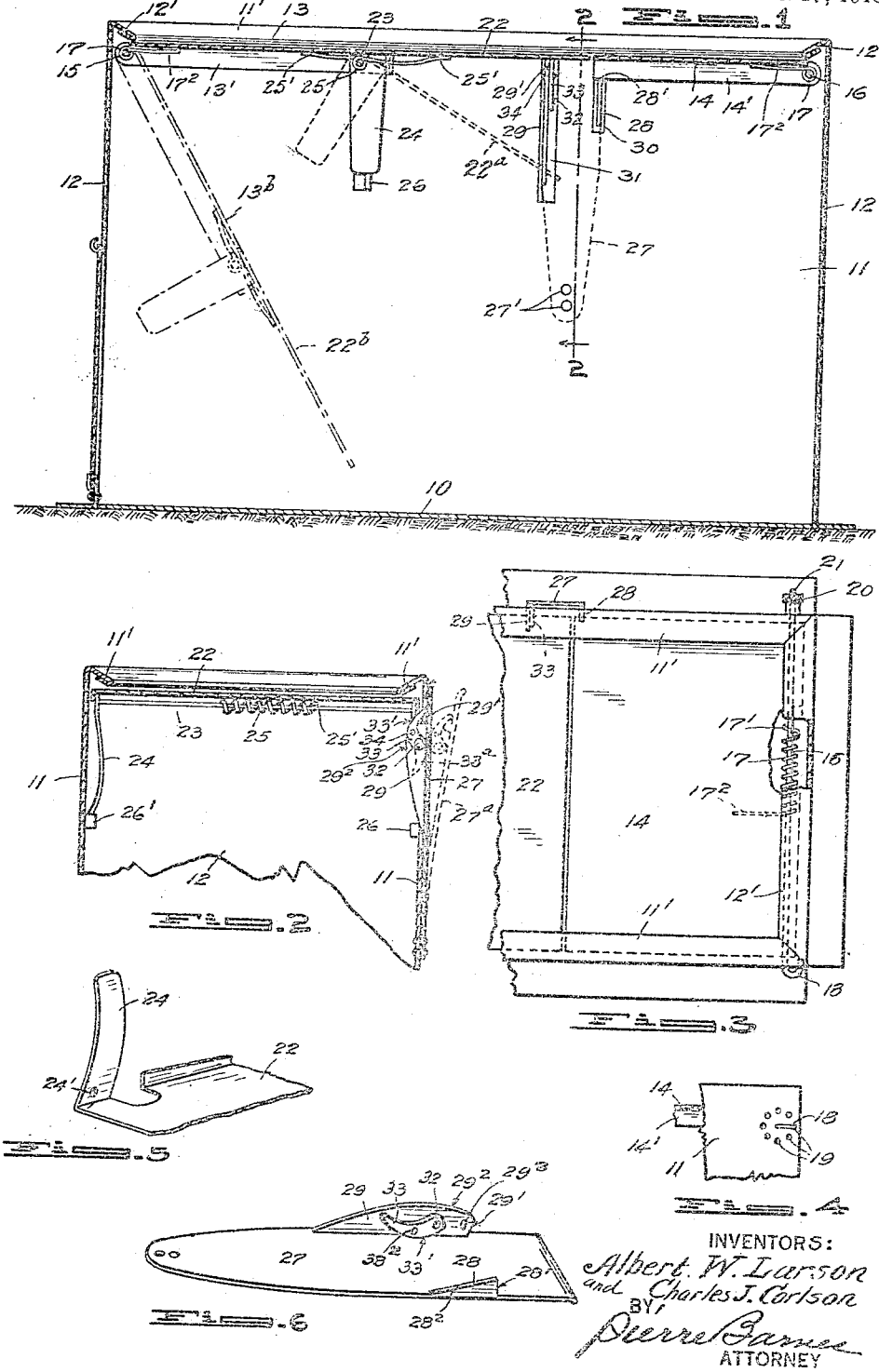

CHARLES J. CARLSON AND ALBERT W. LARSON, OF SEATTLE, WASHINGTON.

ANIMAL-TRAP.

1,287,877.  Specification of Letters Patent.  Patented Dec. 17, 1918.

Application filed April 10, 1918. Serial No. 227,674.

*To all whom it may concern:*

Be it known that we, CHARLES J. CARLSON and ALBERT W. LARSON, citizens of the United States, residing at Seattle, in the county of King and State of Washington, have invented certain new and useful Improvements in Animal-Traps, of which the following is a specification.

This invention relates to improvements in animal traps; and its object is to provide an economically constructed and efficient trap for catching fur bearing and other animals, the construction of the trap admitting of adjustments so that it may be used for catching a number of animals or be limited to a single one between successive settings of the trap.

With the above and other objects in view, the invention consists in the novel construction, adaptation, and combination of parts as will hereinafter be described and claimed.

In the drawings, Figure 1 is a longitudinal vertical section of a trap embodying our invention. Fig. 2 is a sectional view through line 2—2 of Fig. 1. Fig. 3 is a fragmentary plan view of Fig. 1. Fig. 4 is a detail side elevational view of an upper corner of the trap. Fig. 5 is a perspective view of a portion of the trap door. Fig. 6 is a perspective view of the retaining and releasing latch for the trap door.

The body or casing of our improved trap is of a rectangular or box shape having a bottom 10, and side and end walls 11 and 12 from the upper ends of which extend inwardly directed flange elements $11^1$ and $12^1$. Provided below said flange elements at both ends of the top opening are platforms 13 and 14 which are respectively connected at their outer ends to transversely arranged rods 15 and 16 extending through the platform flanges $13^1$ and $14^1$ and also through the trap walls 11 in proximity to the end walls 12. Said rods serve to pivotally connect the platforms to the trap body. For each platform is provided a spring 17 coiled about the respective rods and having one end as $17^1$, Fig. 3, of each spring engage in a slot of a rod and the other end $17^2$ engage under the associated platform and tending to yieldingly hold the latter against the under sides of the body flanges $11^1$. One end of each of said rods is formed with a hook shaped end 18 which is engageable in a selected one of a series of concentrically arranged holes 19, Fig. 4 for retaining the rod in various rotary positions for the purpose of regulating the effective power of the springs 17. Said hook end of a rod is secured in engagement within one of such holes by means of a nut 20 screwed on the threaded end 21 of the rod to bear against the opposite side of the body from that at which the hook is engaged. 22 represents a door to substantially close the space between the adjacent ends of the aforesaid platforms.

Said door is hingedly connected to the platform 13 adjacent to its end by means of a rod 23 extending through apertures such as $24^1$ in legs or props 24 depending from the door to pivotally engage in holes provided in the platform flanges. 25 represents a coil spring surrounding rod 23 and having its ends $25^1$ arranged to press against the under sides of the platform 13 and door 22. 26 and $26^1$ represent bracket pieces protruding into the compartment of the trap to serve as a bearing for the lower ends of said legs. 27 represents a resilient latch formed of a plate of spring metal secured at its lower end by rivets $27^1$ to one of the side walls 11. At its opposite sides, said latch plate is provided with limbs 28 and 29 adapted to extend inwardly through apertures 30 and 31 formed in the referred to side wall. The upper ends of said limbs are formed with shoulders $28^1$ and $29^1$, the first named shoulder being located to extend underneath the adjacent flange $14^1$ of platform 14 to support the same until released when the latch is swerved outwardly.

The shoulder $29^1$ of limb 29 is, however, located at a short distance below the door so as to encounter the same when it is desired that the door should not be allowed to open. Connected to the latch limb 29 by a pin 32 is an arm 33 having curved edge $33^1$ which is arranged to be coextensive or nearly so with the curved edge $29^2$ when the arm is secured in the position in which it is illustrated in Fig. 2. The arm 33 is secured in the above-referred-to position by means of a removable pin 34 inserted in a hole $33^2$ (Fig. 6) of the arm and a hole $29^3$ of the limb 29.

The operation of the invention is as follows: When an animal has passed over either of the platforms 13 or 14 and on to the door 22 its weight depresses the door, causing the latter to act through the medium of the arm 33 to swerve the latch outward as indicated by broken lines $27^a$ in Fig. 2 whereby the latch-limb 28 is withdrawn from below the platform 14 allowing it to be swung downwardly should any of the animal's weight be applied thereon. The door in being swung downwardly, see dotted lines 22ª in Fig. 1, causes its legs 24 to be swung from the bracket pieces whereupon the platform 13 being unsupported by said legs accompanies the door in its downward travel as indicated by dotted lines 13ᵇ with respect to the door when in dotted line 22ᵇ position in Fig. 1.

After the animal has been deposited in the trap compartment the springs 17 assert their power to return the two platforms 13, 14 and the door 22 to the positions in which they are represented by full lines in Fig. 1. In thus ascending the latch 27 is successively pressed out by the platform 14 engaging the sloping edge 28² of latch limb 28 and by the door engaging the sloping edge 29² of limb 29. When it is desired to catch but a single animal in the trap, the pin 34 is removed from arm 33 so that the latter will be swung downwardly into 33ª position, Fig. 2, by its inertia as the latch springs back after the door in descending has pushed it outwardly, resulting in the shoulder 29¹ being presented to stop the door from being again lowered until the arm 33 is restored to its operative position.

What we claim is:

1. In an animal trap, a casing having an entrance opening at the top, a trap door therefor, a spring tending to hold said door in its closed position, a latch yieldingly connected to the casing and having a portion normally extending below said door and serving as a stop to prevent the door being opened, and means provided on the referred to latch portion and adapted to be regulated to enable the door to be opened one or more times selectively.

2. In an animal trap, the combination of the trap casing having an entrance opening at the top, a closure for the casing opening said closure comprising a door member and a platform member pivotally connected together, said platform member being connected by a pivotal rod to said casing, a spring provided for the connection between the platform and door member to yieldingly retain them in alinement with each other, a spring connected with said pivotal rod for closing both said members with respect to the casing entrance, said rod being adapted to be secured to the casing in selected rotary positions for regulating the effective power of the associated spring, and means rendered operable by the movements of the door member independently of the platform member whereby the latter is releasably held in its closed position.

Signed at Seattle, Washington, this 4th day of April, 1918.

CHARLES J. CARLSON.
ALBERT W. LARSON.

Witnesses:
 PIERRE BARNES,
 HANNAH JONES.